United States Patent [19]

Greer

[11] Patent Number: 4,859,087
[45] Date of Patent: Aug. 22, 1989

[54] ROTARY DIE LATERAL ADJUSTMENT BEARING BLOCK ASSEMBLY

[75] Inventor: Larry J. Greer, Chesterfield, Mo.

[73] Assignee: Allied Gear and Machine Co., Inc., St. Louis, Mo.

[21] Appl. No.: 262,433

[22] Filed: Oct. 24, 1988

[51] Int. Cl.⁴ ............................................ F16C 23/00
[52] U.S. Cl. .................................... 384/255; 384/258
[58] Field of Search ............... 384/255, 258, 259, 260, 384/247, 519, 583

[56] References Cited

U.S. PATENT DOCUMENTS

| | | | |
|---|---|---|---|
| 1,703,767 | 2/1929 | Golden | 384/258 |
| 3,473,469 | 10/1969 | Sipin | 384/258 |
| 3,664,717 | 5/1972 | Pendergrass et al. | 384/519 |
| 4,714,355 | 12/1987 | Poloni et al. | 384/258 |

Primary Examiner—Lenard A. Footland
Attorney, Agent, or Firm—Cohn, Powell & Hind

[57] ABSTRACT

A journal bearing block (10) has opposed sides (62, 63) received in sliding relation between the opposed sides defined by gibs (14, 16) of a slot (18) of a printing press sideframe (12). One of the gibs (14) has an elongate groove (54) and one of the bearing block sides (62) has an adjacent elongate groove (74). A key (86) is received by the bearing block groove (64) and includes an outstanding portion (90) extending into the gib groove. The key includes a threaded opening (70) and is connected to the bearing block by a rotatable adjustment screw (74). The key is narrower than the bearing block groove but substantially the same thickness as the gib groove, whereby rotation of the adjustment screw causes the key to travel laterally in the bearing block groove with the result that the bearing block, with its rotary die journal travels laterally relative to the sideframe (12). One of the gibs defining the sideframe slot is adjustably attached within its associated groove (30) by rotatable adjustment fasteners (40) having an eccentric portion (42) to move said gib and the other gib is fixedly attached with its associated groove (32) to vary the width of the sideframe slot.

11 Claims, 1 Drawing Sheet

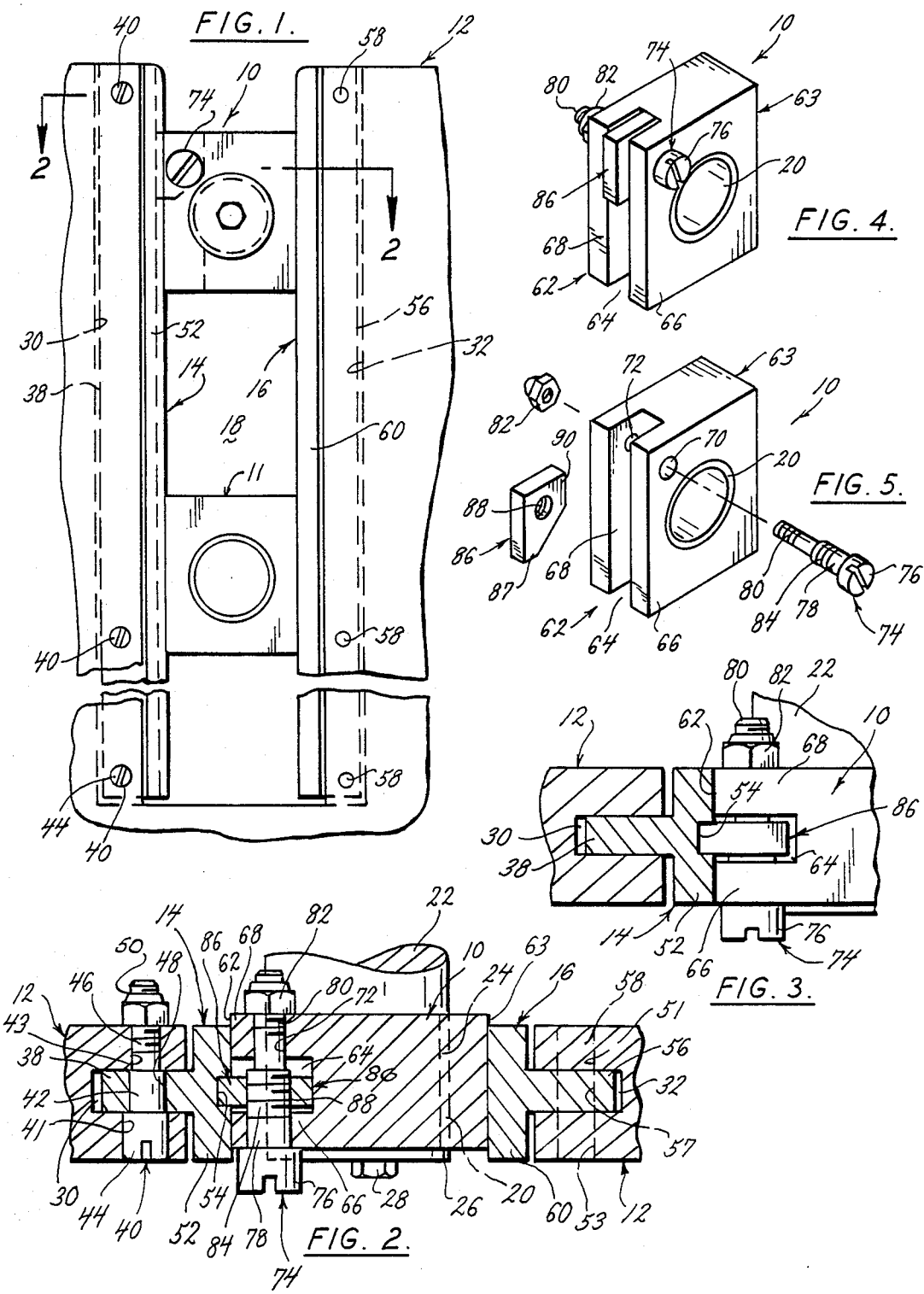

ROTARY DIE LATERAL ADJUSTMENT BEARING BLOCK ASSEMBLY

BACKGROUND OF THE INVENTION

This invention relates generally to a lateral adjustment device for a printing press die and more particularly to a laterally adjustable journal bearing block.

Web-fed printing press dies which have on their surface engraved patterns are placed in contact with a hardened anvil roll with the web therebetween. The rotary die ends are carried by journal bearing blocks which are mounted in sliding relation in slots formed in the sideframes provided on each side of the printing press. The rotary dies require accurate lateral alignment with the anvil cylinder and it is desirable to provide for lateral adjustment of the die relative to the cylinder, that is, across the web.

In the past such lateral adjustment has most commonly been provided by providing shims at both ends between the journal bearing blocks and the die journal faces. This shimming is provided not only to register the die properly but also to remove slack to prevent the die from shifting laterally while the press is running. However, shimming in this way leads to considerable inconvenience when a minor adjustment is required since it is necessary to stop the press in order to re-shim.

Attempts have been made to overcome this objection by providing special bearing devices which shift the die journals within the bearing blocks. However, such devices tend to be complicated and bulky. They usually include pressure springs, thrust bearing, hand screws and other relatively expensive components to push the die toward gearside and allow spring pressure to return the die toward the operator side. Such special bearing devices tend to be bulky and difficult to load into the sideframe slots and also tend to be expensive.

The present lateral adjustment bearing block solves these and other problems in a manner not revealed in the known prior art.

SUMMARY OF THE INVENTION

This printing press rotary die lateral adjustment device provides an improved bearing block which is used in conjunction with an improved sideframe slot to provide lateral adjustment. The device is lightweight, easily installed and readily adjusted within the die slot. Only one special bearing block is required, on the operator side, which includes a movable key received within a sideframe slot linear groove and readily adjusted by means of a single screw. The workside journal of the rotary die is provided with means holding the journal against lateral slippage while permitting rotation.

It is an aspect of this invention to provide support means including a slot having opposed sides, at least one of said sides including an elongate groove; a bearing block having a journal-receiving opening, said block having opposed sides, at least one of said sides including a groove disposed adjacent to the elongate groove of said support means, said bearing block groove having laterally adjacent sides having a lateral bore passing therethrough; key means having a first portion received within said bearing block groove and a second portion extending outwardly of said bearing block groove and received within said slot side elongate groove, said first portion being narrower than said journal block groove for lateral movement therewithin and said second portion being substantially the same thickness as said elongate groove for sliding movement therewithin substantially without lateral movement, and said key means first portion including a threaded opening, and adjustable fastener means received by the bore through the bearing block said fastener means having a threaded portion received within the threaded opening of said key means first portion, whereby rotation of said fastener means moves said journal block laterally with respect to said support means.

It is another aspect of this invention to provide that said key means is of uniform thickness.

It is yet another aspect of this invention to provide that said slot sides are provided by opposed gib members, at least one of said members being movable toward the other of said members.

It is still another aspect of this invention to provide that said gib members are substantially Tee-shaped including a stem portion and a head portion and to provide that said sideframe includes opposed elongate grooves each receiving the stem of an associate gib member.

Another aspect of this invention is to provide that one of the gib members head portion includes an elongate groove receiving said key means.

Yet another aspect of this invention is to provide that each of said sideframe grooves includes opposed sides having a plurality of openings; each of said gib member stems includes a plurality of associated openings; a plurality of fasteners are provided received by said groove side openings and said stem openings, and the fasteners received in the associated opening of one gib member each include an axially eccentric portion received in said stem openings whereby rotation of said fasteners provides movement of said one gib member relative to the other gib member.

Still another aspect of this invention is to provide that the fasteners received in associated openings of the other gib member provided fixed attachment of said gib member.

It is another aspect of this invention to provide that said bearing journal-receiving opening includes a bushing at least in part entering said bearing block groove, and said key plate is cut away to avoid interference with said bushing.

Another aspect of this invention is to provide that said bearing block includes journal retaining means cooperating with said journal to permit rotation of said journal within said block but providing for lateral movement of said journal with said block.

It is an aspect of this invention to provide a laterally adjustable bearing block assembly which is relatively easy and inexpensive to manufacture, simple to install and effective in operation.

BRIEF DESCRIPTION OF THE DRAWINGS

FIG. 1 is an end view of a journal bearing block mounted in a sideframe slot;

FIG. 2 is a cross-sectional view taken on line 2—2 of FIG. 1 showing the bearing block in one position of lateral adjustment;

FIG. 3 is a similar view to FIG. 2 showing the bearing block in another position of lateral adjustment;

FIG. 4 is a perspective view of a bearing block, and

FIG. 5 is a similar view to FIG. 4 showing the bearing block components in exploded relation.

DESCRIPTION OF THE PREFERRED EMBODIMENT

Referring now by reference numerals to the drawing and first to FIG. 1 it will be understood that an upper, laterally adjustable rotary die journal bearing block 10 is shown which is mounted in sliding relation between the opposed elongate rails or gibs 14 and 16 defining the slot 18 of the sideframe 12 of a printing press. A lower, anvil cylinder journal bearing block 11, which is substantially similar to said upper bearing block but which is not laterally adjustable is also mounted in sliding relation between said gibs.

The sideframe 12, which constitutes a support means, is on the operator side of the press and a similar set of gibs is provided for the gearside sideframe (not shown). Also, a conventional journal bearing block, similar to bearing block 11, is provided for the gearside sideframe.

The bearing block 10 includes a bushing 20 and the rotary die journal 22 includes a reduced diameter end portion 24 which is received within said bushing 20. An end member 26 is provided, attached to said journal end portion 24 by a machine bolt 28 such that said journal is rotatable in said bushing but is substantially precluded from lateral movement relative to said bearing block 10.

The journal block 10 and the side gibs 14 and 16 will now be more specifically described. The sideframe 12 is provided with opposed elongate grooves 30 and 32 receiving, respectively, Tee-shaped gibs 14 and 16. Gib 14 is adjustable and gib 16 is fixed but replaceable. Gib 14 includes a tang or stem 38 received in push-fit relation within associated sideframe groove 30. The gib 14 is attached to sideframe 12 by a plurality of adjustment fasteners in the form of machine bolts 40 each of which, as best shown in FIG. 2, includes an eccentric circular portion 42, disposed intermediate the head 44 and the threaded shaft 46. The adjustment fasteners 40 are each received within axially aligned openings 41 and 43 provided in the sides of the sideframe groove 30 and within a circular opening 48 provided in the stem 38. Opening 41 is sized to receive the fastener head 44 and is aligned with opening 43. The adjustment fasteners 40 are each provided with a nut 50 which is arranged to permit rotation of said eccentric portion 42 within said opening 48 without loosening said adjustment fastener. The gib 14 also includes a head 52 which is engageable with the bearing block 10, and which includes a groove 54 cooperating with a corresponding groove in the bearing block 10 as will be hereinafter described. The other gib 16 includes a stem 56 received in push-fit relation with associated elongate groove 32. The gib 16 is attached to the sideframe 12 by a plurality of fasteners in the form of dowel pins 58 which are received within axially aligned openings 51 and 53, provided in the sides of sideframe groove 32, and within circular openings 57 provided within stem 56. The gib 16 also includes a head 60 which is engageable with the bearing block 10. With this structural arrangement of parts adjustment of the width of the sideframe slot is accomplished by rotating fasteners 40 sequentially to ensure that the gibs 14 and 16 maintain a parallel attitude.

This structural arrangement of parts is described in co-pending application Ser. No. 261,917, 10-24-88, which is incorporated herein by reference.

The bearing block 10 is best shown by reference to FIGS. 2 and 4 and, as shown, includes opposed sides 62 and 63, said side 62 including a groove 64, which is disposed adjacent said gib head groove 54, but is wider than said elongate groove 54. Bearing block groove 64 is defined by laterally adjacent sides 66 and 68 which are provided with openings 70 and 72 respectively receiving an adjustable fastener in the form of a machine bolt 74. Fastener 74 includes an unthreaded portion 78 adjacent the head 76 and received within the opening 70. A threaded end portion 80 is received within the opening 72 adjacent the nut 82 and a larger diameter threaded portion 84 is disposed between said portions 78 and 82 substantially within the bearing block groove 64.

A key 86 is carried by the bearing block 10, said key having a first portion 87 substantially narrower than and received within the bearing block groove 64, said key including a threaded opening 88 receiving the fastener portion 84 in adjustable threaded relation. The key 86 has an outwardly extending second portion 90 which is substantially the same width as, and is a close sliding fit within, the gib head groove 54. The fastener nut 82 is arranged to permit rotation of said fastener 74 without loosening said fastener such that, as the fastener 74 is rotated, the key 86 travels across the groove 64. In the embodiment shown, the key 86 is of uniform thickness and has a bottom portion 87 which is cut away to avoid the bearing block bushing 20.

Because the bearing block sides 62 and 63 are a close fit within the spaced heads of gibs 14 and 16 and the key 86 is a close fit within gib head groove 54, the bearing block 10 moves laterally relative to the gibs 14 and 16 carrying the rotary die journal 22, and therefore the die as a whole, with it as the fastener 74 is rotated. As will be readily understood the spacing of the gibs 14 and 16 can be adjusted by means of adjustable fasteners 40, which provides the advantage that close tolerance machining of the related parts is unnecessary.

The installation of the fixed and adjustable gibs is very simple. The fixed gib 16 is located with its stem 56 received within the side frame groove 32 and fixed in position by fasteners 58. The adjustable gib 14 is located with its stem 38 received within the sideframe groove 30. Adjustable fasteners 40 are placed in position with the circular eccentric portion 42 received within the circular stem opening 48. A gage block (not shown) representing the preferred slot width is inserted between the gibs 14 and 16 and the adjustable gib 14 is then moved into engagement with said gage block by appropriate rotation of the adjustment fasteners 40. This arrangement provides that readjustment of the gibs can be made throughout the life of the press and damaged gibs can be replaced as necessary.

The installation of this adjustable bearing block assembly is also very simple. The workside bearing block 10 is slipped onto the workside journal 22 of the rotary die and the opposite gearside bearing block (not shown) is slipped onto the. gearside journal. The rotary die is then lowered, with its bearings in place, into associated sideframe slots. Having been previously adjusted, bearing block 10 is received between previously adjusted gibs 14 and 16 such that the key 86 is received within the gib head groove 54. Following this, the rotary die hold down units are installed such as those which are described in copending application Ser. No. 261,918, 10-24-88. Lateral adjustment is easily accomplished when the press is running by turning the adjustment fastener 74. The key 86 remains fixed in lateral position and thus the bearing block moves laterally and carries the die with it. For set-up purposes, it will be readily understood that adjustment must be made prior to the application of hold down pressure.

In view of the above it will be understood that various aspects and features of the invention are achieved and other advantageous results are attained. While a preferred embodiment of the invention has been shown and described, it will be clear to those skilled in the art that various modifications may be made without departing from the invention in its broader aspect.

I claim as my invention:

1. An adjustable journal bearing block assembly for a rotary die comprising:
    (a) support means including a slot having opposed sides, at least one of said sides including an elongate groove;
    (b) a bearing block having a journal-receiving opening, said block having opposed sides, at least one of said sides including a groove disposed adjacent to the elongate groove of said support means, said bearing block groove having laterally adjacent sides having a lateral bore passing therethrough,
    (c) key means having a first portion received within said bearing block groove and a second portion extending outwardly of said bearing block groove and received within said slot side elongate groove, said first portion being narrower than said journal block groove for lateral movement therewithin and said second portion being substantially the same thickness as said elongate groove for sliding movement therewithin substantially without lateral movement, and said key means first portion including a threaded opening, and
    (d) adjustable fastener means received by the bore through the bearing block said fastener means having a threaded portion received within the threaded opening of said key means first portion, whereby rotation of said fastener means moves said journal block laterally with respect to said support means.

2. A bearing block assembly as defined in claim 1, in which:
    (e) said key means is of uniform thickness.

3. A bearing block assembly as defined in claim 1, in which:
    (e) said slot sides are provided by opposed gib members, at least one of said members being movable toward the other of said members.

4. A bearing block assembly as defined in claim 3, in which:
    (f) said gib members are substantially tee-shaped including a stem portion and a head portion.

5. A bearing block assembly as defined in claim 4, in which:
    (g) said sideframe includes opposed elongate grooves each receiving the stem of an associate gib.

6. A bearing block assembly as defined in claim 5, in which:
    (h) each of said sideframe grooves includes opposed sides having a plurality of openings,
    (i) each of said gib member stems includes a plurality of associated openings,
    (j) a plurality of fasteners are provided received by said groove side openings and said stem openings, and
    (k) the fasteners received in the associated opening of one gib member each include an axially eccentric portion received in said stem openings whereby rotation of said fasteners provides movement of said one gib member relative to the other gib member.

7. A bearing block assembly as defined in claim 6, in which:
    (l) the fasteners received in associated openings of the other gib member provided fixed attachment of said gib member.

8. A bearing block assembly as defined in claim 3, in which:
    (f) one of the gib members head portion includes an elongate groove receiving said key means.

9. A bearing block assembly as defined in claim 1, in which:
    (e) said sideframe includes opposed elongate grooves,
    (f) said slot sides are provided by opposed gib members each having a stem portion received in an associated sideframe groove and a head portion receiving one of said bearing blocks sides in sliding relation, one of said head portions having an associated elongate groove, and
    (g) said key means includes a key plate of uniform thickness, said bearing gib groove being substantially the same width as said key plate.

10. A bearing block assembly as defined in claim 7, in which
    (h) said bearing journal-receiving opening includes a bushing at least in part entering said bearing block groove, and
    (i) said key plate is cut away to avoid interference with said bushing.

11. A bearing block assembly as defined in claim 1, in which:
    (e) said bearing block includes journal retaining means cooperating with said journal to permit rotation of said journal within said block but providing for lateral movement of said journal with said block.

* * * * *